United States Patent

Siddall

[15] 3,681,385

[45] Aug. 1, 1972

[54] EPITHIO ALIPHATIC KETONES FOR THE CONTROL OF INSECTS

[72] Inventor: John B. Siddall, Palo Alto, Calif.

[73] Assignee: Zoecon Corporation, Palo Alto, Calif.

[22] Filed: May 19, 1969

[21] Appl. No.: 826,005

[52] U.S. Cl. ......260/327 E, 260/247.1, 260/247.7 D, 260/247.7 G, 260/247.7 H, 260/268 C, 260/293.67, 260/293.68, 260/293.89, 260/326.5 A, 260/326.5 D, 260/326.5 E, 260/326.55 M, 260/327 M, 260/348, 260/557 R, 260/561 N, 260/586 R, 260/593 R, 260/611 R, 260/614 R, 260/617 R, 260/632, 260/943, 424/248, 424/250, 424/268, 424/274, 424/278, 424/320, 424/324

[51] Int. Cl. ......C07d 59/00, C07d 71/00, C07d 1/00

[58] Field of Search ..................260/327 E

[56] References Cited

UNITED STATES PATENTS

| | | | |
|---|---|---|---|
| 2,520,101 | 8/1950 | Otto | 260/327 |
| 3,073,846 | 1/1963 | Millikan | 260/327 |

*Primary Examiner*—Henry R. Jiles
*Assistant Examiner*—Cecilia Shurko
*Attorney*—Donald W. Erickson

[57] ABSTRACT

Methods employing and compositions comprising an aliphatic hydrocarbon amide, ester, alcohol or ether having a chain length of 12–17 carbon atoms, unsaturation and C-2,3, lower alkyl group at C-3, C-7 and C-11, unsaturation saturation or cyclopropyl group at C-6,7 and epithiol or trithiocarbonate group at C-10,11 which are useful for the control of insects.

8 Claims, No Drawings

EPITHIO ALIPHATIC KETONES FOR THE CONTROL OF INSECTS

This invention relates to methods and compositions for the control of insects. More particularly, the present invention relates to methods and compositions for the control of insects and to novel aliphatic hydrocarbon amides, acids, esters, alcohols and ethers of the following formulas (A) and (B):

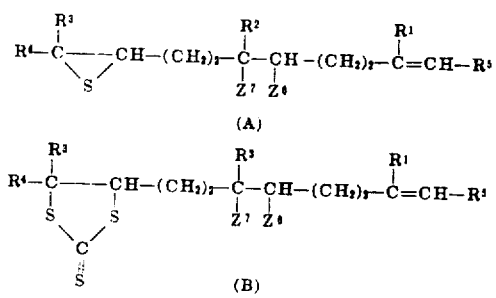

wherein, each of $R^1$, $R^2$, $R^3$ and $R^4$ is lower alkyl;

$Z^6$ is hydrogen, $Z^7$ is hydrogen, or, $Z^6$ and $Z^7$ taken together is the group

or a carbon-carbon double bond between C-6,7; and $R^5$ is selected from the groups

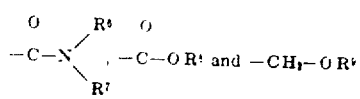

in which each of $R^6$ and $R^7$ is hydrogen, lower alkyl, cycloalkyl, lower hydroxyalkyl, lower alkoxyalkyl, lower alkenyl, phenyl, or, when taken together with the nitrogen to which they are attached, pyrrolidino, morpholino, piperidino, piperazino or 4-lower alkyl-piperazino;

$R^8$ is selected from hydrogen, lower alkyl, metals and cycloalkyl; and $R^9$ is selected from hydrogen, lower alkyl and cycloalkyl.

The term "lower alkyl," as used herein, refers to a straight or branched chain saturated aliphatic hydrocarbon group having a chain length of one to six carbon atoms, e.g. methyl, ethyl, propyl, i-propyl, n-butyl, s-butyl, t-butyl, pentyl and hexyl. The term "cycloalkyl," as used herein, refers to a cycloalkyl group containing three to eight carbon atoms, e.g. cyclopropyl, cyclopentyl and cyclohexyl. The term "lower hydroxyalkyl," as used herein, refers to a lower alkyl group substituted with one hydroxy group, e.g. hydroxymethyl, β-hydroxyethyl and 4-hydroxypentyl. The term "lower alkoxyalky," as used herein, refers to a lower alkyl group substituted with one alkoxy group, the alkoxy group having a chain length of one to six carbon atoms and being straight or branched chains, e.g. methoxymethyl, 2-methoxyethyl, 4-ethoxybutyl, n-propoxyethyl and t-butoxyethyl. The term "metals," as used herein, refers to lithium, sodium, potassium, calcium, strontium, copper, manganese and zinc. The term "lower alkenyl," as used herein, refers to an ethylenically unsaturated aliphatic hydrocarbon group, branched or straight chain, having a chain length of one to six carbon atoms, e.g. allyl, vinyl, 3-butenyl, 2-butenyl, 2-hexenyl and i-propenyl.

The compounds of formulas A and B are prepared by reacting an epoxide with alkali metal lower alkyl xanthate, such as potassium methyl xanthate, potassium ethyl xanthate and sodium methyl xanthate in an organic solvent inert to the reaction, such as methanol, which can be outlined as follows:

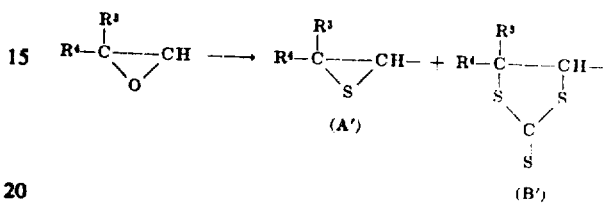

The episulfide (A') and trithiocarbonate (B') are produced as a mixture and are separated by chromatography.

The following method is useful for the preparation of the compounds of formula A and B in which $R^5$ is —$CONR^6R^7$ or —$COOR^8$:

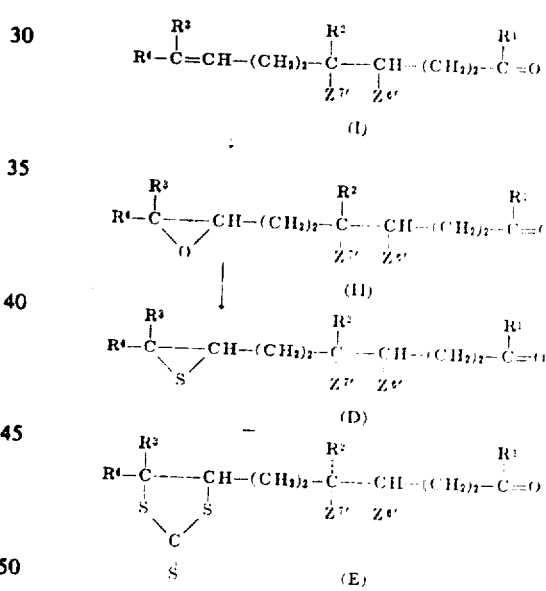

In the above formulas, $R^1$, $R^2$, $R^3$ and $R^4$ are as defined above and $Z^{6'}$ is hydrogen, $Z^{7'}$ is hydrogen, or, $Z^{6'}$ and $Z^{7'}$ taken together is the group

or a carbon-carbon double bond.

In the practice of the above-outlined procedure, the ketone (I) is converted into the epoxide (II) using m-chloroperbenzoic acid, or the like, in methylene chloride or other solvent. The epoxide (II) is then treated with, e.g. potassium methyl xanthate in methanol, at a temperature of from about room temperature to reflux temperature for several hours, generally at reflux temperature for about 8 to 12 hours, to yield a mixture of the episulfide (D) and the trithiocarbonate (E) which can be separated by chromatography.

The compounds of formulas A and B wherein $R^5$ is —CONR$^6$R$^7$ are prepared by treating the intermediates D and E, respectively, with the novel phosphonamide (III) in the presence of an alkali metal hydride.

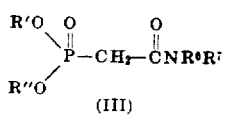

(III)

In formula III, $R^6$ and $R^7$ are as defined above and each of R' and R'' is lower alkyl or cycloalkyl.

The compounds of formulas A and B wherein $R^5$ is —COOR$^8$ are prepared by treating the novel intermediates D and E, respectively, with a phosphonate of formula IV in the presence of an alkali metal hydride.

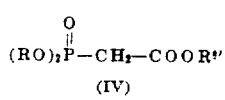

(IV)

In formula IV, $R^{8'}$ is lower alkyl or cycloalkyl and R is lower alkyl. The compounds of formulas A and B wherein $R^5$ is —COOR$^8$ in which $R^8$ is hydrogen are obtained by hydrolysis of an ester, e.g. the methyl ester, using sodium carbonate, or the like.

The compounds of formulas A and B wherein $R^5$ is —CH$_2$—OR$^9$ or —CONR$^6$R$^7$ are prepared by treating the corresponding 10,11-epoxide with an alkali metal lower alkyl xanthate using the conditions described above. The procedure can be outlined as follows:

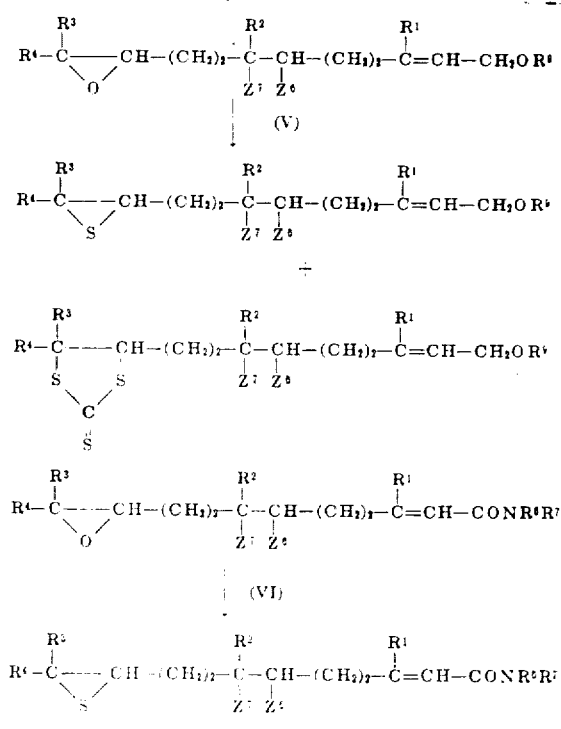

in which $R^1$, $R^2$, $R^3$, $R^4$, $R^6$, $R^7$, $R^9$, $Z^6$ and $Z^7$ are as defined above.

The phosphonamide (III) is prepared by the reaction of an β-bromoacetamide (IIIA) with a di-substituted phosphite (IIIB) in the presence of the base e.g. sodium hydride in an inert solvent, such as ether, tetrahydrofuran or monoglyme under an inert atmosphere and at a temperature of about −10° C to room temperature.

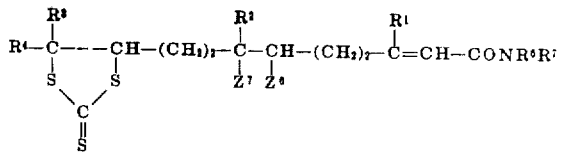

(IIIA)        (IIIB)              (III)

wherein R', R'', $R^6$ and $R^7$ are as defined above.

Typical di-substituted phosphites include dimethylphosphite, diethylphosphite, dicyclohexylphosphite, di-n-butylphosphite and dicyclopentylphosphite. The N-substituted α-bromoacetamides and N,N-di-substituted α-bromoacetamides of formula IIIA are prepared by the reaction of bromoacetyl bromide and the appropriate amine. Typical amines include diethylamine, di-n-butylamine, allylamine, i-propylamine, di-i-propylamine, dimethylamine, methylamine, ethylamine, morpholine, di-n-pentylamine, n-hexylamine, i-butylamine, di-i-butylamine, di-n-propylamine, piperidine and piperazine which upon reaction with bromoacetyl bromide yields the corresponding α-bromoacetamide of formula IIIA. The preparation of α-bromoacetamides is described by Weaver and Whaley, Journal of the American Chemical Society 69, 515 (1947) and references cited therein.

The phosphonamides of formula III are useful for the preparation of the long chain amides of formula VI by reaction with a ketone of formula I or II in the presence of base, e.g. sodium hydride. Preferably, the phosphonamide (III) is reacted with the ketone (I) to form a compound of formula VI' which is then epoxidized at C-10,11 using m-chloroperbenzoic acid. The compounds of formula VI and VI' are useful insect control agents.

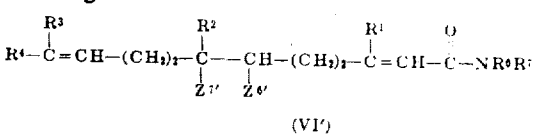

(VI')

The epoxides of formula II can be prepared by reacting the correspondingly unsaturated ketone of formula I with m-chloroperbenzoic acid in methylene chloride or chloroform. Where the ketone (I) is di-unsaturated ($Z^{6'}=Z^{7'}$=double bond), a mixture of mono- and bis-epoxides is obtained which is separated by chromatography to obtain the epoxides (II) with $Z^6$ and $Z^{7'}$ being a double bond. The epoxides (II) in which $Z^{6'}=Z^{7'}$=hydrogen can be prepared using the correspondingly unsaturated ketone (I; $Z^{6'}=Z^{7'}$=H) or by hydrogenation of the correspondingly unsaturated epoxide (II; $Z^{6'}$ and $Z^{7'}$ is a double bond) using palladium-on-carbon or palladium-on-calcium carbonate.

The cyclopropyl group ($Z^{6'}$ and $Z^{7'}$ is

) is introduced in the ketone (I) before epoxidation of I. This can be done using methylene iodide and zinc-copper couple in the manner of Simmons and Smith, Journal of the American Chemical Society 81, 4256 (1959) or U.S. Pat. No. 3,074,984.

The presence of a double bond at position C-2,3, a double bond at C-6,7, a cyclic group at C-6,7 and a cyclic group at C-10,11 in the compounds of the present invention gives rise to isomerism in the configuration of these compounds. Each of the isomers can be separated by chromatography, such as gas-liquid chromatography and, in most cases, by fractional distillation and used individually as pest control agents, in which case trans configuration at C-2,3 is preferred, or the isomeric mixture can be employed in pest control compositions.

In accordance with the present invention, there is provided a method for the control of insects which comprises contacting the insects with a compound selected from those of formulas A and B above in an amount effective to inhibit the metamorphosis of said insects. To aid in achieving a uniform distribution or application, it is advantageous to employ a composition comprising an inert carrier and, as the essential active ingredient, a compound of formula A or B. One method for the control of insects in accordance with the present invention is to apply the composition comprising an inert carrier and a compound of formula A or B to the locus of insect infestation such as to the plant life on which the insects live. These compositions can be either solid or liquid. Solid compositions for treating insects can be prepared by incorporating the active compound with an inert carrier such as finely divided talc, silica, pyrophyllite or clay or granular inert carriers such as the vermiculites. Liquid compositions can be prepared by mixing the active compound with inert carriers such as acetone, xylene, peanut oil, cottonseed oil, sesame oil and other vegetable oils and mineral oils conventionally employed as carriers in insecticidal formulations for application by spraying. Emulsions containing the active ingredient can also be used. Other ingredients can be present in the compositions of the present invention to aid in the effective application of the active ingredient such as wetting agents, dispersing agents, insect attractants, and the like. The concentration of active ingredient, a compound of formula A or B, in the composition can vary greatly and will depend on a variety of factors such as the specific insect involved, degree of insect infestation, environmental and weather conditions and type of application device used. Generally, the composition will contain less than 95 percent by weight of the active ingredient and more frequently less than 10 percent by weight. The compounds of formulas A and B are useful insect control agents by virtue of their ability to inhibit the metamorphosis of the insect. The expression "to inhibit the metamorphosis of said insects," as used herein and in the appended claims, is used to describe the direct insecticidal effect of the compounds of formulas A and B as well as the indirect insecticidal effect of said compounds. In some cases the compounds have a direct insecticidal effect in that the insect dies upon contact with a compound of formula A or B, particularly, when the compound is applied at the egg stage and larvae stage of the insect's life. In other cases the compounds of the present invention have an indirect insecticidal effect in that upon contact with a compound of formula A or B during the egg stage, larvae stage or pupa stage, the insect is unable to pass from one metamorphic stage to the next in a normal manner and eventually dies without reproducing. Typical of the insects of the class Insecta which can be controlled in accordance with the present invention are ti Dysdercus cingulatus, Tenebrio molitor, Galleria mellonella, Tribolium confusum, Periplaneta americana, Hypera puctata (clover leaf weevil), Dysdercus suturellus, Aphididae, such as melon aphid and cabbage aphid, Tinea pellionella, Sitophilus granarius, Lygus hesperus and Sckistocerca vaga.

The following examples are provided to illustrate the present invention. Temperature is in degrees Centigrade.

PREPARATION 1

A mixture of 7 g. of methylene iodide and 3 g. of zinc-copper couple in 15 ml. of anhydrous ether is heated at reflux under nitrogen for three hours. The mixture is then cooled and 2 g. of N,N-diethyl 3,7,11-trimethyldodeca-2,6,10-trienamide is added. This mixture is allowed to stand at room temperature for 20 hours and is then poured into 200 ml. of 2 percent aqueous sodium carbonate and extracted with ether. The extracts are dried over sodium sulfate and evaporated to yield N,N-diethyl 6,7-methylene-3,7,11-trimethyldodeca-2,10-dienamide and the corresponding 10,11-methylene and 6,7;10,11-bismethylene from which the desired 6,7-methylene-2,10-dienamide is separated by chromatography.

By repeating the above procedure using other compounds of formula VI' having a double bond at C-6,7 as the starting material, the corresponding 6,7-methylenes are obtained. For example, N,N-dimethyl 6,7-methylene-3,7,11-trimethyldodeca-2,10-dienamide, N,N-morpholino 6,7methylene-3,7,11-trimethyldodeca-2,10-dienamide, N,N-diethyl 6,7-methylene-3,7,11-trimethyltrideca-2,10-dienamide, N,N-diethyl 6,7-methylene-3,11-dimethyl-7-ethyltrideca-2,10-dienamide, N,N-diethyl 6,7-methylene-3,11-dimethyl-7-ethyldodeca-2,10-dienamide, N,N-diethyl 6,7-methylene-3,7-dimethyl-11-ethyltrideca-2,10-dienamide, N,N-diethyl 6,7-methylene-7,11-dimethyl-3-ethyldodeca-2,10-dienamide, and N,N-diethyl 6,7-methylene-3,7,11-trimethyltrideca-2,10-dienamide are obtained from N,N-dimethyl 3,7,11-trimethyldodeca-2,6,10-trienamide, N,N-morpholino 3,7,11-trimethyldodeca-2,6,10-trienamide, N,N-diethyl 3,7,11-trimethyltrideca-2,6,10-trienamide, N,N-diethyl 3,11-dimethyl-7-ethyltrideca-2,6,10-trienamide, N,N-diethyl 3,11-dimethyl-7-ethyldodeca-2,6,10-trienamide,
N,N-diethyl 3,7-dimethyl-11-ethyltrideca-2,6,10-trienamide,
N,N-diethyl 7,11-dimethyl-3-ethyldodeca-2,6,10-trienamide, and
N,N-diethyl 3,7,11-triethyltrideca-2,6,10-trienamide, respectively.

PREPARATION 2

A mixture of 7 g. of methylene iodide and 3 g. of zinc-copper couple in 15 ml. of anhydrous ether is heated at reflux under nitrogen for 3 hours. The mixture is then cooled and 2 g. of 1-ethoxy 3,7,11-trimethyldodeca-2,6,10-triene is added. This mixture is allowed to stand at room temperature for 20 hours and is then poured into 200 ml. of 2 percent aqueous sodium carbonate and extracted with ether. The extracts are dried over sodium sulfate and evaporated to yield 1-ethoxy-6,7-methylene-3,7,11-trimethyldodeca-2,10-diene and the corresponding 10,11-methylene and 6,7;10,11-bismethylene from which the desired 6,7-methylene is separated by chromatography.

By repeating the above procedure using other compounds of formula V' having a double bond at C-6,7 as the starting material, the corresponding 6,7-methylenes are obtained. For example, each of 1-ethoxy-6,7-methylene-3,7,11-trimethyltrideca-2,10-diene, 1-methoxy-6,7-methylene-3,7,11-trimethyldodeca-2,10-diene, 6,7-methylene-3,7,11-trimethyldodeca-2,10-dien-1-ol, 1-ethoxy-6,7-methylene-7-ethyl-3,11-dimethyltrideca-2,10-diene, 1-ethoxy-6,7-methylene-7-ethyl-3,11-dimethyldodeca-2,10-diene, 1-ethoxy-6,7-methylene-3,7-dimethyl-11-ethyltrideca-2,10-diene, 1-ethoxy-6,7-methylene-7,11-dimethyl-3-ethyltrideca-2,10-diene, 1-cyclohexyloxy-6,7-methylene-3,7,11-trimethyldodeca-2,10-diene, 1-cyclopentyloxy-6,7-methylene-3,7,11-trimethyldodeca-2,10-diene, and 1-methoxy-6,7-methylene-3,7,11-trimethyltrideca-2,10-diene are obtained from 1-ethoxy-3,7,11-trimethyltrideca-2,6,10-triene,
1-methoxy-3,7,11-trimethyldodeca-2,6,10-triene,
3,7,11-trimethyldodeca-2,6,10-trien-1-ol,
1-ethoxy-7-ethyl-3,11-dimethyltrideca-2,6,10-triene,
1-ethoxy-7-ethyl-3,11-dimethyldodeca-2,6,10-triene,
1-ethoxy-3,7-dimethyl-11-ethyltrideca-2,6,10-triene,
1-ethoxy-7,11-dimethyl-3-ethyltrideca-2,6,10-triene,
1-cyclohexyloxy-3,7,11-trimethyldodeca-2,6,10-triene,
1-cyclopentyloxy-3,7,11-trimethyldodeca-2,6,10-triene, and
1-methoxy-3,7,11-trimethyltrideca-2,6,10-triene, respectively.

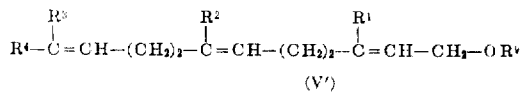

(V')

in which $R^1$, $R^2$, $R^3$, $R^4$ and $R^9$ are as defined above.

Ethers of formula V' are prepared by treating the corresponding alcohol (V', $R^9$ is H) with a lower alkyl halide or cycloalkyl halide, such as the iodide, in the presence of sodium hydride in an organic solvent, such as benzene.

PREPARATION 3

To a mixture of 2 g. of 6,10-dimethylundeca-5,9-dien-2-one in 150 ml. of methylene chloride at 0° C, there is slowly added 1.0 molar equivalent of m-chloroperbenzoic acid in 100 ml. of methylene chloride. The resulting mixture is then allowed to stand for 15 minutes at 0° C and then washed with 2 percent aqueous sodium sulfite solution with 5 percent aqueous sodium bicarbonate solution and with water, dried over sodium sulfate and evaporated to yield a mixture of 9,10-oxido-6,10-dimethylundec-5-en-2-one, 5,6;9,10-bisoxido-6,10-dimethylundecan-2-one and 5,6-oxido-6,10-dimethylundec-9-en-2-one from which 9,10-oxido-6,10-dimethylundec-5-en-2-one is separated by chromatography.

By repeating this preparation there is prepared 9,10-oxido-6,10-dimethyldodec-5-en-2-one, 9,10-oxido-6-methyl-10-ethyldodec-5-en-2-one, 9,10-oxido-6-ethyl-10-methyldodec-5-en-2-one, 10,11-oxido-7,11-diethyltridec-6-en-3-one, 9,10-oxido-6-ethyl-10-methylundec-5-en-2-one and 10,11-oxido-7,11-dimethyldodec-6-en-3-one by using each of 6,10-dimethyldodeca-5,9-dien-2-one, 6-methyl-10-ethyldodeca-5,9-dien-2-one, 6-ethyl-10-methyldodeca-5,9-dien-2-one, 7-ethyl-11-ethyltrideca-6,10-dien-3-one, 6-ethyl-10-methylundeca-5,9-dien-2-one and 7,11-dimethyldodeca-6,10-dien-2-one, respectively, as the starting material in place of 6,10-dimethylundeca-5,9-dien-2-one.

PREPARATION 4

A mixture of 7 g. of methylene iodide and 3 g. of zinc-copper couple in 15 ml. of anhydrous ether is heated at reflux under nitrogen for 3 hours. The mixture is then cooled and 2.5 g. of 6,10-dimethylundec-5,9-dien-2-one is added. This mixture is allowed to stand at room temperature for 10 hours and is then poured into 200 ml. of 2 percent aqueous sodium carbonate and extracted twice with 100 ml. portions of ether. The extracts are dried over sodium sulfate and evaporated under reduced pressure to yield a mixture containing 5,6-methylene-6,10-dimethylundec-9-en-2-one which is separated and purified by chromatography.

The above procedure is repeated with the exception of using as the starting material other dienes of formula I such as 6,10-dimethyldodeca-5,9-dien-2-one, 6-methyl-10-ethyldodeca-5,9-dien-2-one, 6-ethyl-10-methyldodeca-5,9-dien-2-one, 7,11-diethyltrideca-6,10-dien-3-one, 6-ethyl-10-methylundeca-5,9-dien-2-one and 7,11-dimethyldodeca-6,10-dien-3-one to yield 5,6-methylene-6,10-dimethyldodec-9-en-2-one, 5,6-methylene-6-methyl-10-ethyldodec-9-en-2-one, 5,6-methylene-6-ethyl-10-methyldodec-9-en-2-one, 6,7-methylene-7,11-diethyltridec-10-en-3-one, 5,6-methylene-6-ethyl-10-methylundec-9-en-2-one and 6,7-methylene-7,11-dimethyldodec-10-en-3-one, respectively By using each of the above-outlined mono-unsaturated compounds as the starting material in the process of Preparation 3, there is obtained the corresponding epoxide, that is, 5,6-methylene-9,10-oxido-6,10-dimethylundecan-2-one, 5,6-methylene-9,10-oxido-6,10-dimethyldodecan-2-one, 5,6-methylene-9,10-oxido-6-methyl-10-ethyldodecan-2-one, 5,6-methylene-9,10-oxido-6-ethyl-10-methyldodecan-2-one, 6,7-methylene-10,11-oxido-7,11-diethyltridecan-3-one, 5,6-methylene-9,10-oxido-6-ethyl-10-methylundecan-2-one and 6,7-methylene-10,11-oxido-7,11-dimethyldodecan-3-one, respectively.

PREPARATION 5

A suspension of 0.5 g. of 5 percent palladium-on-carbon catalyst in 50 ml. of benzene is hydrogenated for about 30 minutes. A solution of 2 g. of 9,10-oxido-6,10-dimethylundec-5-en-2-one is added and hydrogenated with agitation until the theoretical amount of hydrogen has been absorbed. The catalyst is thereafter removed by filtration and the solution is evaporated to yield 9,10-oxido-6,10-dimethylundecan-2-one.

By repeating this procedure using each of the other mono-unsaturated epoxides of Preparation 3 as the starting material, there is obtained 9,10-oxido-6,10-dimethyldodecan-2-one, 9,10-oxido-6-methyl-10-ethyldodecan-2-one, 9,10-oxido-6-ethyl-10-methyldodecan-2-one, 10,11-oxido-7,11-diethyltridecan-3-one, 9,10-oxido-6-ethyl-10-methylundecan-2-one and 10,11-oxido-7,11-dimethyldodecan-3-one, respectively.

Alternatively, a di-unsaturated ketone of formula I is hydrogenated using the above procedure to obtain a mono-unsaturated ketone (I, $Z^{6'}=Z^{7'}=H$) which is then epoxidized using the procedure of Preparation 3 to afford the epoxide (II, $Z^{6'}=Z^{7'}=H$).

PREPARATION 6

The process of Preparation 3 is repeated with the exception that each of the 2,10-dienamides prepared in preparation 1 is used as the starting material to yield N,N-diethyl 10,11-oxido-6,7-methylene-3,7,11-trimethyldodec-2-enamide, N,N-dimethyl 6,7-methylene-10,11-oxido-3,7,11-trimethyldodec-2-enamide, N,N-morpholino 6,7-methylene-10,11-oxido-3,7,11-trimethyldodec-2-enamide, N,N-diethyl 6,7-methylene-10,11-oxido-3,7,11-trimethyltridec-2-enamide, N,N-diethyl 6,7-methylene-10,11-oxido-3,11-dimethyl-7-ethyltridec-2-enamide, N,N-diethyl 6,7-methylene-10,11-oxido-3,11-dimethyl-7-ethyldodec-2-enamide, N,N-diethyl 6,7-methylene-10,11-oxido-3,7-dimethyl-11-ethyltridec-2-enamide, N,N-diethyl 6,7-methylene-10,11-oxido-7,11-dimethyl-3-ethyldodec-2-enamide, and N,N-diethyl 6,7-methylene-10,11-oxido-3,7,11-trimethyltridec-2-enamide, respectively.

Similarly, by using each of the 2,6,10-trienamides listed in Preparation 1 as the starting material in the process of Preparation 3, there is obtained N,N-diethyl 10,11-oxido-3,7,11-trimethyldodeca-2,6-dienamide, N,N-dimethyl 10,11-oxido-3,7,11-trimethyldodeca-2,6-dienamide, N,N-morpholino 10,11-oxido-3,7,11-trimethyldodeca-2,6-dienamide, N,N-diethyl 10,11-oxido-3,7,11-trimethyltrideca-2,6-dienamide, N,N-diethyl 10,11-oxido-3,11-dimethyl-7-ethyltrideca-2,6-dienamide, N,N-diethyl 10,11-oxido-3,11-dimethyl-7-ethyldodeca-2,6-dienamide, N,N-diethyl 10,11-oxido-3,7-dimethyl-11-ethyltrideca-2,6-dienamide, N,N-diethyl 10,11-oxido-7,11-dimethyl-3-ethyldodeca-2,6-dienamide, and N,N-diethyl 10,11-oxido-3,7,11-triethyltrideca-2,6-dienamide.

respectively, which can be hydrogenated using the procedure of Preparation 5 to obtain the corresponding 6,7-dihydro compounds.

PREPARATION 7

The process of Preparation 3 is repeated with the exception that each of the 2,10-dienes of Preparation 2 is used as the starting material to yield 1-ethoxy-6,7-methylene-10,11-oxido-3,7,11-trimethyldodec-2-ene, 1-ethoxy-6,7-methylene-10,11-oxido-3,7,11-trimethyltridec-2-ene, 1-methoxy-6,7-methylene-10,11-oxido-3,7,11-trimethyldodec-2-ene, 6,7-methylene-10,11-oxido-3,7,11-trimethyldodec-2-en-1-ol, 1-ethoxy-6,7-methylene-10,11-oxido-7-ethyl-3,11-dimethyltridec-2-ene, 1-ethoxy-6,7-methylene-10,11-oxido-3,7-dimethyl-11-ethyltridec-2-ene, 1-ethoxy-6,7-methylene-10,11-oxido-7,11-dimethyl-3-ethyltridec-2-ene, 1-cyclohexyloxy-6,7-methylene-10,11-oxido-3,7,11-trimethyldodec-2-ene, 1-cyclopentyloxy-6,7-methylene-10,11-oxido-3,7,11-trimethyldodec-2-ene, and 1-methoxy-6,7-methylene-10,11-oxido-3,7,11-trimethyltridec-2-ene, respectively.

Similarly, by using each of the 2,6,10-trienes listed in Preparation 2 as the starting material in the process of Preparation 3, there is obtained 1-ethoxy-10,11-oxido-3,7,11-trimethyldodeca-2,6-diene, 1-ethoxy-10,11-oxido-3,7,11-trimethyldodeca-2,6-diene, 1-methoxy-10,11-oxido-3,7,11-trimethyldodeca-2,6-diene, 10,11-oxido-3,7,11-trimethyldodeca-2,6-dien-1-ol, 1-ethoxy-10,11-oxido-7-ethyl-3,11-dimethyltrideca-2,6-diene, 1-ethoxy-10,11-oxido-7-ethyl-3,11-dimethyldodeca-2,6-diene, 1-ethoxy-10,11-oxido-3,7-dimethyl-11-ethyltrideca-2,6-diene, 1-ethoxy-10,11-oxido-7,11-dimethyl-3-ethyltrideca-2,6-diene, 1-cyclohexyloxy-10,11-oxido-3,7,11-trimethyldodeca-2,6-diene, 1-cyclopentyloxy-10,11-oxido-3,7,11-trimethyldodeca-2,6-diene, and 1-methoxy-10,11-oxido-3,7,11-trimethyltrideca-2,6-diene, respectively, which can be hydrogenated using the procedure of Preparation 5 to obtain the corresponding 6,7-dihydro compounds.

EXAMPLE 1

Part A

A mixture of 1 g. of 9,10-oxido-6,10-dimethylundec-5-en-2-one and 10 molar equivalents of potassium methyl xanthate and 100 ml. of methanol is refluxed for 15 hours. The reaction mixture is allowed to cool, poured into water and then extracted with ether. The ether extracts are combined, dried over sodium sulfate and evaporated to yield a mixture of 9,10-epithio-6,10-dimethylundec-5-en-2-one (D, $Z^6{}'$ and $Z^7{}'$ taken together is a double bond and each of $R^1$, $R^2$, $R^3$ and $R^4$ is methyl) and 9,10-trithiocarbonato-6,10-dimethylundec-5-en-2-one (E, $Z^6{}'$ and $Z^7{}'$ taken together is a double bond and each of $R^1$, $R^2$, $R^3$ and $R^4$ is methyl) which can be separated and purified by chromatography or distillation.

The above procedure is repeated using each of the other epoxides of Preparation 3 as the starting material to yield 9,10-epithio-6,10-dimethyldodec-5-en-2-one and
9,10-trithiocarbonato-6,10-dimethyldodec-5-en-2-one;
9,10-epithio-6-methyl-10-ethyldodec-5-en-2-one and
9,10-trithiocarbonato-6-methyl-10-ethyldodec-5-en-2-one;
9,10-epithio-6-ethyl-10-methyldodec-5-en-2-one and
9,10-trithiocarbonato-6-ethyl-10-methyldodec-5-en-2-one;
10,11-epithio-7,11-diethyltridec-6-en-3-one and
10,11-trithiocarbonato-7,11-diethyltridec-6-en-3-one;
9,10-epithio-6-ethyl-10-methylundec-5-en-2-one and
9,10-trithiocarbonato-6-ethyl-10-methylundec-5-en-2-one; and
10,11-epithio-7,11-dimethyldodec-6-en-3-one and
10,11-trithiocarbonato-7,11-dimethyldodec-6-en-3-one, respectively.

Part B

By repeating the procedure of Part A of this example using each of 5,6-methylene-9,10-oxido-6,10-dimethylundecan-2-one; 5,6-methylene-9,10-oxido-6,10-dimethyldodecan-2-one; 5,6-methylene-9,10-oxido-6-methyl-10-ethyldodecan-2-one; 6,7-methylene-10,11-oxido-7,11-diethyltridecan-3-one; 5,6-methylene-9,10-oxido-6-ethyl-10-methylundecan-2-one; and 6,7-methylene-10,11-oxido-7,11-dimethyldodecan-3-one as the starting material, there is obtained 5,6-methylene-9,10-epithio-6,10-dimethylundecan-2-one and
5,6-methylene-9,10-trithiocarbonato-6,10-dimethylundecan-2-one;
5,6-methylene-9,10-epithio-6,10-dimethyldodecan-2-one and
5,6-methylene-9,10-trithiocarbonato-6,10-dimethyldodecan-2-one;
5,6-methylene-9,10-epithio-6-methyl-10-ethyldodecan-2-one and
5,6-methylene-9,10-trithiocarbonato-6-methyl-10-ethyldodecan-2-one;
6,7-methylene-10,11-epithio-7,11-diethyltridecan-3-one and
6,7-methylene-10,11-trithiocarbonato-7,11-diethyltridecan-3-one;
5,6-methylene-9,10-epithio-6-ethyl-10-methylundecan-2-one and
5,6-methylene-9,10-trithiocarbonato-6-ethyl-10-methylundecan-2-one; and
6,7-methylene-10,11-epithio-7,11-dimethyldodecan-3-one and
6,7-methylene-10,11-trithiocarbonato-7,11-dimethyldodecan-3-one, respectively.

Part C

By repeating the procedure of Part A of this example using each of 9,10-oxido-6,10-dimethylundecan-2-one;
9,10-oxido-6,10-dimethyldodecan-2-one;
9,10-oxido-6-methyl-10-ethyldodecan-2-one;
9,10-oxido-6-ethyl-10-methyldodecan-2-one;
10,11-oxido-7,11-diethyltridecan-3-one;
9,10-oxido-6-ethyl-10-methylundecan-2-one; and
10,11-oxido-7,11-dimethyldodecan-3-one as the starting material, there is obtained
9,10-epithio-6,10-dimethylundecan-2-one and
9,10-trithiocarbonato-6,10-dimethylundecan-2-one;
9,10-epithio-6,10-dimethyldodecan-2-one and
9,10-trithiocarbonato-6,10-dimethyldodecan-2-one;
9,10-epithio-6-methyl-10-ethyldodecan-2-one and
9,10-trithiocarbonato-6-methyl-10-ethyldodecan-2-one;
9,10-epithio-6-ethyl-10-methyldodecan-2-one and
9,10-trithiocarbonato-6-ethyl-10-methyldodecan-2-one;
10,11-epithio-7,11-diethyltridecan-3-one and
10,11-trithiocarbonato-7,11-diethyltridecan-3-one;
9,10-epithio-6-ethyl-10-methylundecan-2-one and
9,10-trithiocarbonato-6-ethyl-10-methylundecan-2-one; and
10,11 epithio-7,11-dimethyldodecan-3-one and
10,11-trithiocarbonato-7,11-dimethyldodecan-3-one, respectively,

EXAMPLE 2

Part A

A mixture of 3.4 g. of diethyl carbethoxy methylphosphonate in 50 ml. of diglyme is treated with 0.8 g. of sodium hydride. The mixture is stirred until the evolution of gas ceases and 2.8 g. of 9,10-epithio-6,10-dimethylundec-5-en-2-one is added slowly with stirring under nitrogen atmosphere, maintaining a temperature below 10°. This mixture is stirred for about 8 hours at about room temperature and then diluted with water and extracted with ether. The ether extracts are combined, washed with water, dried over sodium sulfate and evaporated to give ethyl 10,11-epithio-3,711-trimethyldodeca-2,6-dienoate.

The above procedure is repeated using each of
9,10-epithio-6,10-dimethyldodec-5-en-2-one,
9,10-epithio-6-methyl-10-ethyldodec-5-en-2-one,
9,10-epithio-6-ethyl-10-methyldodec-5-en-2-one,
10,11-epithio-7,11-diethyltridec-6-en-3-one,
9,10-epithio-6-ethyl-10-methylundec-5-en-2-one and
10,11-epithio-7,11-dimethyldodec-6-en-3-one as the starting material to yield
ethyl 10,11-epithio-3,7,11-trimethyltrideca-2,6-dienoate,
ethyl 10,11-epithio-3,7-dimethyl-11-ethyltrideca-2,6-dienoate,
ethyl 10,11-epithio-3,11-dimethyl-7-ethyltrideca-2,6-dienoate, ethyl 10,11-epithio-3,7,11-triethyltrideca-2,6-dienoate, ethyl 10,11-epithio-3,11-dimethyl-7-ethyldodeca-2,6-dienoate, and ethyl 10,11-epithio-3-ethyl-7,11-dimethyldodeca-2,6-dienoate, respectively.

Part B

By repeating the procedure of Part A of this example using each of 5,6-methylene-9,10-epithio-6,10-dimethylundecan-2-one, 5,6-methylene-9,10-epithio-6,10-dimethyldodecan-2-one, 5,6-methylene-9,10-epithio-6-methyl-10-ethyl-dodecan-2-one, 5,6-methylene-9,10-epithio-6-ethyl-10-methyl-dodecan-2-one, 6,7-methylene-10,11-epithio-7,11-diethyltridecan-3-one, 5,6-methylene-9,10-epithio-6-ethyl-10-methylundecan-2-one and 6,7-methylene-10,11-epithio-7,11-dimethyldodecan-3-one as the starting material, there is obtained ethyl 6,7-methylene-10,11-epithio-3,7,11-trimethyldodec-2-enoate, ethyl 6,7-methylene-10,11-epithio-3,7,11-trimethyltridec-2-enoate, ethyl 6,7-methylene-10,11-epithio-3,7-dimethyl-11-ethyltridec-2-enoate, ethyl 6,7-methylene-10,11-epithio-3,11-dimethyl-7-ethyltridec-2-enoate, ethyl 6,7-methylene-10,11-epithio-3,7,11-triethyltridec-2-enoate, ethyl 6,7-methylene-10,11-epithio-3,11-dimethyl-7-ethyldodec-2-enoate, and ethyl 6,7-methylene-10,11-epithio-3-ethyl-7,11-dimethyldodec-2-enoate, respectively.

Part C

Each of 9,10-epithio-6,10-dimethylundecan-2-one, 9,10-epithio-6,10-dimethyldodecan-2-one, 9,10-epithio-6-methyl-10-ethyldodecan-2-one, 9,10-epithio-6-ethyl-10-methyldodecan-2-one, 10,11-epithio-7,11-diethyltridecan-3-one, 9,10-epithio-6-ethyl-10-methylundecan-2-one and 10,11-epithio-7,11-dimethyldodecan-3-one is used as the starting material in the procedure of Part A of this example to yield ethyl 10,11-epithio-3,7,11-trimethyldodec-2-enoate, ethyl 10,11-epithio-3,7,11-trimethyltridec-2-enoate, ethyl 10,11-epithio-3,7-dimethyl-11-ethyltridec-2-enoate, ethyl 10,11-epithio-3,11-dimethyl-7-ethyltridec-2-enoate, ethyl -10,11-epithio-3,7,11-triethyltridec-2-enoate, ethyl 10,11-epithio-3,11-dimethyl-7-ethyldodec-2-enoate and ethyl 10,11-epithio-3-ethyl-7,11-dimethyldodec-2-enoate, respectively.

In place of the use of diethyl carbethoxy methylphosphonate in this example, there can be used other methylphosphonate in this example, there can be used other methylphosphonates, such as diethyl carbomethoxy methylphosphonate, diethyl carbo(n-propoxy)methylphosphonate, dimethyl carbobutoxy methylphosphonate, and the like, to obtain the corresponding methyl esters, n-propyl esters, n-butyl esters, and the like.

EXAMPLE 3

A mixture of 1 g. of ethyl 10,11-epithio-3,7,11-trimethyldodeca-2,6-dienoate, 60 ml. of methanol, 0.2 g. of sodium carbonate and 6 ml. of water is stirred at about 30° for 3 hours. The mixture is diluted with water, neutralized to pH 7 and extracted with ether. The ether extracts are combined, washed with water, dried over sodium sulfate and evaporated at room temperature to yield 10,11-epithio-3,7,11-trimethyldodeca-2,6-dienoic acid which is purified by chromatography.

Using the above procedure, the other esters of Example 2 can be converted into the free acid.

EXAMPLE 4

The process of Example 2 (Part A) is repeated with the exception that each of 9,10-trithiocarbonato-6,10-dimethylundec-5-en-2-one, 9,10-trithiocarbonato-6,10-dimethyldodec-5-en-2-one, 9,10-trithiocarbonato-6-methyl-10-ethyldodec-5-en-2-one, 9,10-trithiocarbonato-6-ethyl-10-methyldodec-5-en-2-one, 9,10-trithiocarbonato-5,6-methylene-6,10-dimethylundecan-2-one, 9,10-trithiocarbonato-5,6-methylene-6,10-dimethyldodecan-2-one, 9,10-trithiocarbonato-5,6-methylene-6-methyl-10-ethyldodecan-2-one, 9,10-trithiocarbonato-5,6-methylene-6-ethyl-10-methyldodecan-2-one, 9,10-trithiocarbonato-6,10-dimethylundecan-2-one, 9,10-trithiocarbonato-6,10-dimethyldodecan-2-one, 9,10-trithiocarbonato-6-methyl-10-ethyldodecan-2-one, and 9,10-trithiocarbonato-6-ethyl-10-methyldodecan-2-one is used as the starting material in place of 9,10-epithio-6,10-dimethylundec-5-en-2-one to yield ethyl 10,11-trithiocarbonato-3,7,11-trimethyldodeca-2,6-dienoate, ethyl 10,11-trithiocarbonato-3,7,11-trimethyltrideca-2,6-dienoate, ethyl 10,11-trithiocarbonato-3,7-dimethyl-11-ethyltrideca-2,6-dienoate, ethyl 10,11-trithiocarbonato-3,11-dimethyl-7-ethyltrideca-2,6-dienoate, ethyl 10,11-trithiocarbonato-5,6-methylene-3,7,11-trimethyldodec-2-enoate, ethyl 10,11-trithiocarbonato-5,6-methylene-3,7,11-trimethyltridec-2-enoate, ethyl 10,11-trithiocarbonato-5,6-methylene-3,7-dimethyl-11-ethyltridec-2-enoate, ethyl 10,11-trithiocarbonato-5,6-methylene-3,11-dimethyl-7-ethyltridec-2-enoate, ethyl 10,11-trithiocarbonato-3,7,11-trimethyldodec-2-enoate, ethyl 10,11-trithiocarbonato-3,7,11-trimethyltridec-2-enoate, ethyl 10,11-trithiocarbonato-3,7,-dimethyl-11-ethyltridec-2-enoate, and ethyl 10,11-trithiocarbonato-3,11-dimethyl-7-ethyltridec-2-enoate, respectively.

EXAMPLE 5

Part A

A mixture of 1 g. of N,N-diethyl 10,11-oxido-3,7,11-trimethyldodec-2,6-dienamide and 10 molar equivalents of potassium methyl xanthate and 100 ml. of methanol is refluxed for 15 hours. The reaction mixture is allowed to cool, poured into water and then extracted with ether. The ether extracts are combined, dried over sodium sulfate and evaporated to yield a mixture of N,N-diethyl 10,11-epithio-3,7,11-trimethyldodeca-2,6-dienamide and N,N-diethyl 10,11-trithiocarbonato-3,7,11-trimethyldodeca-2,6-dienamide which is separated and purified by chromatography.

The foregoing procedure is repeated with the exception of using each of

N,N-dimethyl 10,11-oxido-3,7,11-trimethyldodeca-2,6-dienamide,

N,N-morpholino 10,11-oxido-3,7,11-trimethyldodeca-2,6-dienamide,

N,N-diethyl 10,11-oxido-3,7,11-trimethyltrideca-2,6-dienamide,

N,N-diethyl 10,11-oxido-3,11-dimethyl-7-ethyltrideca-2,6-dienamide,

N,N-diethyl 10,11-oxido-3,11-dimethyl-7-ethyldodeca-2,6-dienamide,

N,N-diethyl 10,11-oxido-3,7-dimethyl-11-ethyltrideca-2,6-dienamide,

N,N-diethyl 10,11-oxido-7,11-dimethyl-3-ethyldodeca-2,6-dienamide, and

N,N-diethyl 10,11-oxido-3,7,11-triethyltrideca-2,6-dienamide as the starting material, there is obtained N,N-dimethyl 10,11-epithio-3,7,11-trimethyldodeca-2,6-dienamide and N,N-dimethyl 10,11-trithiocarbonato-3,7,11-trimethyldodeca-2,6-dienamide;

N,N-morpholino 10,11-epithio-3,7,11-trimethyldodeca-2,6-dienamide and

N,N-morpholino 10,11-trithiocarbonato-3,7,11-trimethyldodeca-2,6-dienamide;

N,N-diethyl 10,11-epithio-3,7,11-trimethyltrideca-2,6-dienamide and

N,N-diethyl 10,11-trithiocarbonato-3,7,11-trimethyltrideca-2,6-dienamide;

N,N-diethyl 10,11-epithio-3,11-dimethyl-7-ethyltrideca-2,6-dienamide and

N,N-diethyl 10,11-trithiocarbonato-3,11-dimethyl-7-ethyltrideca-2,6-dienamide;

N,N-diethyl 10,11-epithio-3,11-dimethyl-7-ethyldodeca-2,6-dienamide and

N,N-diethyl 10,11-trithiocarbonato-3,11-dimethyl-7-ethyldodeca-2,6-dienamide;

N,N-diethyl 10,11-epithio-3,7-dimethyl-11-ethyltrideca-2,6-dienamide and

N,N-diethyl 10,11-trithiocarbonato-3,7-dimethyl-11-ethyltrideca-2,6-dienamide;

N,N-diethyl 10,11-epithio-7,11-dimethyl-3-ethyldodeca-2,6-dienamide and

N,N-diethyl 10,11-trithiocarbonato-7,11-dimethyl-3-ethyldodeca-2,6-dienamide;

N,N-diethyl 10,11-epithio-3,7,11-triethyltrideca-2,6-dienamide and

N,N-diethyl 10,11-trithiocarbonato-3,7,11-triethyltrideca-2,6-dienamide, respectively.

Part B

The procedure of Part A of this example is repeated using as the starting material each of N,N-diethyl 6,7-methylene-10,11-oxido-3,7,11-trimethyldodec-2-enamide, N,N-diethyl 6,7-methylene-10,11-oxido-3,7,11-trimethyldodec-2-enamide, N,N-dimethyl 6,7-methylene-10,11-oxido-3,7,11-trimethyldodec-2-enamide, N,N-morpholino 6,7-methylene-10,11-oxido-3,7,11-trimethyldodec-2-enamide, N,N-diethyl 6,7-methylene-10,11-oxido-3,7,11-trimethyltridec-2-enamide, N,N-diethyl 6,7-methylene-10,11-oxido-3,11-dimethyl-7-ethyltridec-2-enamide, N,N-diethyl 6,7-methylene-10,11-oxido-3,11-dimethyl-7-ethyldodec-2-enamide, N,N-diethyl 6,7-methylene-10,11-oxido-3,7-dimethyl-11-ethyltridec-2-enamide, N,N-diethyl 6,7-methylene-10,11-oxido-7,11-dimethyl-3-ethyldodec-2-enamide, and N,N-diethyl 6,7-methylene-10,11-oxido-3,7,11-triethyltridec-2-enamide to yield N,N-diethyl 6,7-methylene-10,11-epithio-3,7,11-trimethyldodec-2-enamide and N,N-diethyl 6,7-methylene-10,11-trithiocarbonato-3,7,11-trimethyldodec-2-enamide;

N,N-dimethyl 6,7-methylene-10,11-epithio-3,7,11-trimethyldodec-2-enamide and

N,N-dimethyl 6,7-methylene-10,11-trithiocarbonato-3,7,11-trimethyldodec-2-enamide;

N,N-morpholino 6,7-methylene-10,11-epithio-3,7,11-trimethyldodec-2-enamide and

N,N-morpholino 6,7-methylene-10,11-trithiocarbonato-3,7,11-trimethyldodec-2-enamide;

N,N-diethyl 6,7-methylene-10,11-epithio-3,7,11-trimethyltridec-2-enamide and

N,N-diethyl 6,7-methylene-10,11-trithiocarbonato-3,7,11-trimethyltridec-2-enamide;

N,N-diethyl 6,7-methylene-10,11-epithio-3,11-dimethyl-7-ethyltridec-2-enamide and N,N-diethyl 6,7-methylene-10,11-trithiocarbonato-3,11-dimethyl-7-ethyltridec-2-enamide;

N,N-diethyl 6,7-methylene-10,11-epithio-3,11-dimethyl-7-ethyldodec-2-enamide and N,N-diethyl 6,7-methylene-10,11-trithiocarbonato-3,11-dimethyl-7-ethyldodec-2-enamide;

N,N-diethyl 6,7-methylene-10,11-epithio-3,7-dimethyl-11-ethyltridec-2-enamide and N,N-diethyl 6,7-methylene-10,11-trithiocarbonato-3,7-dimethyl-11-ethyltridec-2-enamide;

N,N-diethyl 6,7-methylene-10,11-epithio-7,11-dimethyl-3-ethyldodec-2-enamide and N,N-diethyl 6,7-methylene-10,11-trithiocarbonato-7,11-dimethyl-3-ethyldodec-2-enamide; and N,N-diethyl 6,7-methylene-10,11-epithio-3,7,11-triethyltridec-2-enamide and N,N-diethyl 6,7-methylene-10,11-trithiocarbonato-3,7,11-triethyltridec-2-enamide, respectively.

Part C

Each of N,N-diethyl 10,11-oxido-3,7,11-trimethyldodec-2-enamide; N,N-dimethyl 10,11-oxido-3,7,11-trimethyldodec-2-enamide; N,N-morpholino 10,11-oxido-3,7,11-trimethyldodec-2-enamide; N,N-diethyl 10,11-oxido-3,7,11-trimethyltridec-2-enamide; N,N- diethyl 10,11-oxido-3,11-dimethyl-7-ethyltridec-2-enamide; and N,N-diethyl 10,11-oxido-3,7-dimethyl-11-ethyltridec-2-enamide is used as the starting material in the procedure of Part A of this example to yield N,N-diethyl 10,11-epithio-3,7,11-trimethyldodec-2-enamide and N,N-diethyl 10,11-trithiocarbonate-3,7,11-trimethyldodec-2-enamide; N,N-dimethyl 10,11-epithio-3,7,11-trimethyldodec-2-enamide and N,N-dimethyl 10,11-trithiocarbonato-3,7,11-trimethyldodec-2-enamide; N,N-morpholino 10,11-epithio-3,7,11-trimethyldodec-2-enamide and N,N-morpholino 10,11-trithiocarbonato-3,7,11-trimethyldodec-2-enamide; N,N-diethyl 10,11-epithio-3,7,11-trimethyltridec-2-enamide and N,N-diethyl 10,11-trithiocarbonato-3,7,11-trimethyltridec-2-enamide; N,N-diethyl 10,11-epithio-3,11-dimethyl-7-ethyltridec-2-enamide and N,N-diethyl 10,11-trithiocarbonato-3,11-dimethyl-7-ethyltridec-2-enamide; and N,N-diethyl 10,11-epithio-3,7-dimethyl-11-ethyltridec-2-enamide and N,N-diethyl 10,11-trithiocarbonato-3,7-dimethyl-11-ethyltridec-2-enamide, respectively.

EXAMPLE 6

Part A

A mixture of 1 g. of 1-ethoxy-6,7-methylene-10,11-oxido-3,7,11-trimethyldodec-2-ene and 10 molar equivalents of potassium methyl xanthate and 100 ml. of methanol is refluxed for 15 hours. The reaction mixture is allowed to cool, poured into water and then extracted with ether. The ether extracts are combined, dried over sodium sulfate and evaporated to yield a mixture of 1-ethoxy-6,7-methylene-10,11-epithio-3,7,11-trimethyldodec-2-ene and 1-ethoxy-6,7-methylene-10,11-trithiocarbonato-3,7,11-trimethyldodec-2-ene which is separated and purified by chromatography.

By repeating the above procedure using each of
1-ethoxy-6,7-methylene-10,11-oxido-3,7,11-trimethyltridec-2-ene,
1-methoxy-6,7-methylene-10,11-oxido-3,7,11-trimethyltridec-2-ene,
6,7-methylene-10,11-oxido-3,7,11-trimethyldodec-2-en-1-ol,
1-ethoxy-6,7-methylene-10,11-oxido-7-ethyl-3,11-dimethyltridec-2-ene,
1-cyclohexyloxy-6,7-methylene-10,11-oxido-3,7,11-trimethyltridec-2-ene and
1-cyclopentyloxy-6,7-methylene-10,11-oxido-3,7,11-trimethyldodec-2-ene
as the starting material in place of 1-ethoxy-6,7-methylene-10,11-oxido-3,7,11-trimethyldodec-2-ene, there is obtained
1-ethoxy-6,7-methylene-10,11-epithio-3,7,11-trimethyltridec-2-ene and
1-ethoxy-6,7-methylene-10,11-trithiocarbonato-3,7,11-trimethyltridec-2-ene;
1-methoxy-6,7-methylene-10,11-epithio-3,7,11-trimethyltridec-2-ene and
1-methoxy-6,7-methylene-10,11-trithiocarbonato-3,7,11-trimethyltridec-2-ene;
6,7-methylene-10,11-epithio-3,7,11-trimethyldodec-2-en-1-ol and
6,7-methylene-10,11-trithiocarbonato-3,7,11-trimethyldodec-2-en-1-ol;
1-ethoxy-6,7-methylene-10,11-epithio-7-ethyl-3,11-dimethyltridec-2-ene and
1-ethoxy-6,7-methylene-10,11-trithiocarbonato-7-ethyl-3,11-dimethyltridec-2-ene;
1-cyclohexyloxy-6,7-methylene-10,11-epithio-3,7,11-trimethyltridec-2-ene and
1-cyclohexyloxy-6,7-methylene-10,11-trithiocarbonato-3,7,11-trimethyltridec-2-ene;
1-cyclopentyloxy-6,7-methylene-10,11-epithio-3,7,11-trimethyldodec-2-ene and
1-cyclopentyloxy-6,7-methylene-10,11-trithiocarbonato-3,7,11-trimethyldodec-2-ene, respectively.

Part B

The procedure of Part A of this example is repeated using each of
1-ethoxy-10,11-oxido-3,7,11-trimethyldodeca-2,6-diene,
1-ethoxy-10,11-oxido-3,7,11-trimethyltrideca-2,6-diene,
1-methoxy-10,11-oxido-3,7,11-trimethyldodeca-2,6-diene,
1-ethoxy-10,11-oxido-7-ethyl-3,11-dimethyltrideca-2,6-diene,
1-ethoxy-10,11-oxido-11-ethyl-3,7-dimethyltrideca-2,6-diene,
1-ethoxy-10,11-oxido-7-ethyl-3,11-dimethyldodeca-2,6-diene,
1-cyclohexyloxy-10,11-oxido-3,7,11-trimethyltrideca-2,6-diene, and
1-cyclopentyloxy-10,11-oxido-3,7,11-trimethyltrideca-2,6-diene
as the starting material to yield
1-ethoxy-10,11-epithio-3,7,11-trimethyldodeca-2,6-diene and
1-ethoxy-10,11-trithiocarbonato-3,7,11-trimethyldodeca-2,6-diene;
1-ethoxy-10,11-epithio-3,7,11-trimethyltrideca-2,6-diene and
1-ethoxy-10,11-trithiocarbonato-3,7,11-trimethyltrideca-2,6-diene;
1-methoxy-10,11-epithio-3,7,11-trimethyldodeca-2,6-diene and
1-methoxy-10,11-trithiocarbonato-3,7,11-trimethyldodeca-2,6-diene;
1-ethoxy-10,11-epithio-7-ethyl-3,11-dimethyltrideca-2,6-diene and
1-ethoxy-10,11-trithiocarbonato-7-ethyl-3,11-dimethyltrideca-2,6-diene;
1-ethoxy-10,11-epithio-11-ethyl-3,7-dimethyltrideca-2,6-diene and
1-ethoxy-10,11-trithiocarbonato-11-ethyl-3,7-dimethyltrideca-2,6-diene;
1-ethoxy-10,11-epithio-7-ethyl-3,11-dimethyldodeca-2,6-diene and
1-ethoxy-10,11-trithiocarbonato-7-ethyl-3,11-dimethyldodeca-2,6-diene;
1-cyclohexyloxy-10,11-epithio-3,7,11-trimethyltrideca-2,6-diene and
1-cyclohexyloxy10,11-trithiocarbonato-3,7,11-trimethyltrideca-2,6-diene; and
1-cyclopentyloxy-10,11-epithio-3,7,11-trimethyltrideca-2,6-diene and
1-cyclopentyloxy-10,11-trithiocarbonato-3,7,11-trimethyltrideca-2,6-diene, respectively.

Part C

By repeating the procedure of Part A of this example with the exception of using as the starting material each of
1-ethoxy-10,11-oxido-3,7,11-trimethyltridec-2-ene, 1-ethoxy-10,11-oxido-3,7,11-trimethyldodec2-ene,
1-ethoxy-10,11-oxido-7-ethyl-3,11-dimethyltridec-2-ene,
1-ethoxy-10,11-oxido-7-ethyl-3,11-dimethyldodec-2-ene,
1-cyclopentyloxy-10,11-oxido-7-ethyl-3,11-dimethyltridec-2-ene,
1-ethoxy-10,11-oxido-3,7-dimethyl-11-ethyltridec-2-ene,
1-cyclohexyloxy-10,11-oxido-3,7,11-trimethyltridec-2-ene and
1-methoxy-10,11-oxido-7-ethyl-3,11-dimethyltridec-2-ene,
there is obtained
1-ethoxy-10,11-epithio-3,7,11-trimethyltridec-2-ene and
1-ethoxy-10,11-trithiocarbonato-3,7,11-trimethyltridec-2-ene;
1-ethoxy-10,11-epithio-3,7,11-trimethyldodec-2-ene and
1-ethoxy-10,11-trithiocarbonato-3,7,11-trimethyldodec-2-ene;
1-ethoxy-10,11-epithio-7-ethyl-3,11-dimethyltridec-2-ene and
1-ethoxy-10,11-trithiocarbonato-7-ethyl-3,11-dimethyltridec-2-ene;
1-ethoxy-10,11-epithio-7-ethyl-3,11-dimethyldodec-2-ene and
1-ethoxy-10,11-trithiocarbonato-7-ethyl-3,11-dimethyldodec-2-ene;
1-cyclopentyloxy-10,11-epithio-7-ethyl-3,11-dimethyltridec-2-ene and
1-cyclopentyloxy-10,11-trithiocarbonato-7-ethyl-3,11-dimethyltridec-2-ene;
1-ethoxy-10,11-epithio-3,7-dimethyl-11-ethyltridec-2-ene and
1-ethoxy-10,11-trithiocarbonato-3,7,-dimethyl-11-ethyltridec-2-ene;
1-cyclohexyloxy-10,11-epithio-3,7,11-trimethyltridec-2-ene and
1-cyclohexyloxy-10,11-trithiocarbonato-3,7,11-trimethyltridec-2-ene; and
1-methoxy-10,11-epithio-7-ethyl-3,11-dimethyltridec-2-ene and
1-methoxy-10,11-trithiocarbonato-7-ethyl-3,11-dimethyltridec-2-ene, respectively.

EXAMPLE 7

To 49.5 g. of sodium hydride in 500 ml. of dry tetrahydrofuran is slowly added 138.1 g. of diethylphosphite while cooling with a water-bath. The mixture is stirred for about 2 hours and then 194 g. of N,N-diethyl α-bromoacetamide is added slowly while cooling with a water-bath. After addition is complete, the reaction mixture is stirred for about 1 hour, diatomaceous earth added and filtered. The filtrate is concentrated under vacuum. The residue is diluted with methylene chloride, washed with brine, dried over magnesium sulfate and evaporated under vacuum to yield N,N-diethyldiethoxyphosphonoacetamide (III, $R'=R''=R^6=R^7$=ethyl) which is further purified by fractional distillation.

EXAMPLE 8

Sodium hydride (1.7 g., 50 percent) is washed three times with dry hexane. The hexane is removed and 15 ml. of dry tetrahydrofuran is added. N,N-diethyl-diethoxyphosphonoacetamide (0.9 g.) dissolved in 5 ml. of dry tetrahydrofuran is added and stirred for about 40 minutes. Then 9,10-epithio-6,10-dimethylundec-5-en-2-one (0.8 g.) in 5 ml. of dry tetrahydrofuran is added with stirring and cooling with an ice-bath. the ice-bath is removed after addition is completed and stirring continued for about 2 hours. Then the mixture is poured into water and extracted with ether. The ether extracts are combined, washed with water, dried over magnesium sulfate and evaporated under reduced pressure to yield N,N-diethyl 10,11-epithio-3,7,11-trimethyldodeca-2,6-dienamide which is purified by chromatography.

EXAMPLE 9

The process of Example 8 is repeated with the exception of using each of 6,10-dimethylundeca-5,9-dien-2-one, 6,10-dimethyldodeca-5,9-dien-2-one, 6-methyl-10-ethyldodeca-5,9-dien-2-one, 6-ethyl-10-methyldodeca-5,9-dien-2-one, 6,10-dimethyldodecan-2-one, 6-ethyl-10-methyldodecan-2-one, 6,10-dimethyldodec-9-en-2-one, 6-ethyl-10-methyldodec-9-en-2-one, and 6,10-dimethyldodec-5-en-2-one as the starting material in place of 9,10-epithio-6,10-dimethylundec-5,9-dien-2-one to yield N,N-diethyl 3,7,11-trimethyldodeca-2,6,10-trienamide,
N,N-diethyl 3,7,11-trimethyltrideca-2,6,10-trienamide,
N,N-diethyl 3,7-dimethyl-11-ethyltrideca-2,6,10-trienamide,
N,N-diethyl 3,11-dimethyl-7-ethyltrideca-2,6,10-trienamide,
N,N-diethyl 3,7,11-trimethyltridec-2-enamide,
N,N-diethyl 3,11-dimethyl-7-ethyltridec-2-enamide,
N,N-diethyl 3,7,11-trimethyltrideca-2,10-dienamide,
N,N-diethyl 3,11-dimethyl-7-ethyltrideca-2,10-dienamide and
N,N-diethyl 3,7,11-trimethyltrideca-2,6-dienamide, respectively.

EXAMPLE 10

The process of Example 7 is repeated with the exception that an equivalent amount of each of N-ethyl α-bromoacetamide, N,N-dimethyl α-bromoacetamide, N-methyl α-bromoacetamide N-n-hexyl α-bromoacetamide, N,N-di-(n-propyl) α-bromoacetamide, N-piperidino α-bromoacetamide, N-pyrrolidyl α-bromoacetamide, α-bromoacetamide, N,N-di(n-butyl) α-bromoacetamide and N-allyl α-bromoacetamide is used in place of N,N-diethyl α-bromoacetamide to yield N-ethyl-diethoxyphosphonoacetamide, N,N-dimethyl-diethoxyphosphonoacetamide, N-methyl-diethoxyphosphonoacetamide, N-n-hexyl-diethoxyphosphonoacetamide, N,N-di-(n-propyl)-diethoxyphosphonoacetamide, N-piperidino-diethoxyphosphonoacetamide, N-pyrrolidyl-diethoxyphosphonoacetamide, diethoxyphosphonoacetamide, N,N-di(n-butyl)-diethoxyphosphonoacetamide and N-allyl-diethoxyphosphonoacetamide, respectively.

By using the above prepared phosphonamides in the process of Examples 8 and 9 in place of N,N-diethyl-diethoxyphosphonoacetamide, the corresponding amides are obtained. For example, N-ethyl 10,11- epithio-3,7,11-trimethyldodeca-2,6-dienamide and N-ethyl 3,7,11-trimethyldodeca-2,6,10-trienamide is obtained from 9,10-epithio-6,10-dimethylundec-5-en-2-one and 6,10-dimethylundeca-5,9-dien-2-one by reaction with the phosphonamide, N-ethyl -diethoxyphosphonoacetamide, using the procedure of Example 8.

EXAMPLE 11

Other novel phosphonamides of formula III can be prepared following the procedure of Example 7 by using other di-substituted phosphites of formula IIIB in place of diethylphosphite. Thus, use of each of dimethylphosphite, di-(n-propyl)phosphite, dicyclohexylphosphite, dicyclopentylphosphite and di-(n-butyl)phosphite in place of diethylphosphite in the procedure of Example 7 yields N,N-diethyl-dimethoxyphosphonoacetamide, N,N-diethyl-di-(n-propyl)phosphonoacetamide, N,N-diethyl-dicyclohexyloxyphosphonoacetamide, N,N-diethyl-dicyclopentyloxyphosphonoacetamide and N,N-diethyl-di-(n-butoxy)-phosphonoacetamide, respectively.

EXAMPLE 12

The use of the compounds of the present invention for the control of insects by inhibiting the metamorphosis of the insect is shown in the table below. The compound used is ethyl 10,11-epithio-3,11-dimethyl-7-ethyltrideca-2,6-dienoate. The compound at the dose given (micrograms) in 1 microliter of absolute alcohol is applied topically on the ventral side to the fifth abdominal segment of 40 pupae of Tenebrio molitor (1–24 hours old). Adult insects are scored as to positive response, negative response or not moulted. A positive response is evidenced by the appearance of juvenile epidermis on the abdomen of the adult or in other words abnormal development of the insect in passing from the pupa stage to the adult stage resulting in inability to reproduce and/or death. Negative response means that juvenile epidermis did not develop. The control (40 pupae) is maintained under identical conditions except that no compound is applied.

| Total Dose | No. of Insects | Response Negative | Response Positive | Not Moulted |
|---|---|---|---|---|
| 0.0 | 40 | 36 | 0 | 4 |
| 0.2 | 40 | 11 | 25 | 4 |
| 0.4 | 40 | 7 | 27 | 6 |
| 0.8 | 40 | 0 | 38 | 2 |

EXAMPLE 13

Compositions useful for the control of insects in accordance with the present invention are exemplified by the following which are applied by spraying from spray rigs or by use of pressurized containers. Parts are by weight.

| | Parts |
|---|---|
| 1 | |
| ethyl 10,11-epithio-3,7,11-trimethyldodeca-2,6-dienoate | 5 |
| xylene | 95 |
| 2 | |
| N,N-diethyl 10,11-epithio-3,11-dimethyl-7-ethyldodeca-2,6,-dienamide | 10 |
| cottonseed oil | 90 |
| 3 | |
| ethyl 10,11-epithio-3,7,11-trimethyltridec-2-enoate | 15 |
| sesame oil | 85 |

What is claimed is:

1. A compound of the formula D:

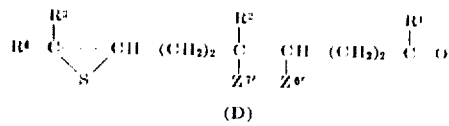

(D)

wherein,
each of $R^1$, $R^2$, $R^3$ and $R^4$ is lower alkyl; and
$Z^{6'}$ is hydrogen, $Z^{7'}$ is hydrogen, or, $Z^{6'}$ and $Z^{7'}$ taken together is the group

or a carbon-carbon double bond.

2. A compound of formula D:

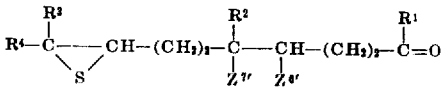

wherein each of $R^1$ and $R^4$ is methyl; each of $R^2$ and $R^3$ is ethyl; and each of $Z^{6'}$ and $Z^{7'}$ is hydrogen.

3. A compound of formula D:

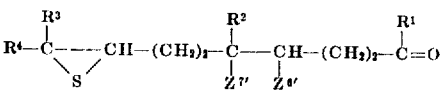

wherein, each of $R^1$, $R^2$, $R^3$ and $R^4$ is lower alkyl; and $Z^{7'}$ and $Z^{6'}$ taken together is the group

4. A compound of Formula D:

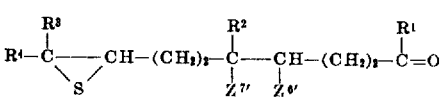

wherein each of $R^1$, $R^2$, $R^3$ and $R^4$ is lower alkyl; and $Z^{6'}$ and $Z^{7'}$ taken together is a carbon-carbon double bond.

5. A compound according to claim 1 wherein each of $R^1$, $R^2$, $R^3$ is methyl or ethyl.

6. The compound, 9,10-epithio-6-ethyl-10-methyldodec-5-en-2-one, according to claim 1.

7. A compound of formula D according to claim 1 wherein each of $R^1$, $R^2$, $R^3$ and $R^4$ is methyl.

8. A compound of formula according to claim 1 wherein each of $R^1$, $R^2$ and $R^3$ is methyl and $R^4$ is ethyl.

* * * * *

UNITED STATES PATENT OFFICE
CERTIFICATE OF CORRECTION

Patent No. 3,681,385  Dated August 1, 1972

Inventor(s) John B. Siddall

It is certified that error appears in the above-identified patent and that said Letters Patent are hereby corrected as shown below:

(1) Page 1, item [73]: "Zolcon" should read --Zoecon--.

(2) Page 1, item [54] and top of Col. 1: "FOR THE CONTROL OF INSECTS" should read --AS CHEMICAL INTERMEDIATES--.

(3) Col. 4, line 11: "β" should read --α--.

(4) Col. 22, in Claim 1, the formula should appear as shown below instead of as in the patent.

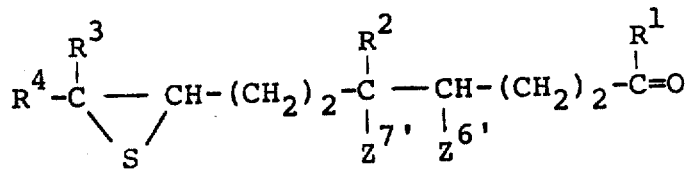

(5) Col. 22, in Claim 5: "$R^3$ is methyl or ethyl." should read --$R^3$ and $R^4$ is methyl or ethyl.--.

(6) Col. 22, in Claim 8: "formula according" should read --formula D according--.

Signed and sealed this 17th day of December 1974.

(SEAL)
Attest:

McCOY M. GIBSON JR.
Attesting Officer

C. MARSHALL DANN
Commissioner of Patents